(12) United States Patent
Zhang

(10) Patent No.: US 8,724,474 B2
(45) Date of Patent: May 13, 2014

(54) TELECOMMUNICATION PORT TESTING APPARATUS

(75) Inventor: Gang Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 840 days.

(21) Appl. No.: 12/845,745

(22) Filed: Jul. 29, 2010

(65) Prior Publication Data
US 2012/0008504 A1  Jan. 12, 2012

(30) Foreign Application Priority Data
Jul. 7, 2010 (CN) .......................... 2010 1 0219821

(51) Int. Cl.
*H04M 1/24* (2006.01)
*G01R 31/08* (2006.01)

(52) U.S. Cl.
USPC ......................................... 370/241; 379/1.01

(58) Field of Classification Search
USPC ...................... 370/241; 324/750.02; 379/1.01
See application file for complete search history.

(56) References Cited

U.S. PATENT DOCUMENTS

| 5,017,878 A | 5/1991 | Nave et al. |
| 7,245,511 B2 | 7/2007 | Lancaster et al. |
| 2009/0206669 A1* | 8/2009 | Draeger .......................... 307/64 |
| 2010/0308851 A1* | 12/2010 | Schwager et al. ........ 324/750.02 |

FOREIGN PATENT DOCUMENTS

| TW | I227783 | 2/2005 |
| TW | 200627744 | 8/2006 |
| TW | M300912 | 11/2006 |
| WO | 2009/056181 A1 | 5/2009 |

OTHER PUBLICATIONS

European Telecommunications Standards Institute, ETSI 300 047-1: Integrated Services Digital Network; ETSI, p. 18.*

* cited by examiner

*Primary Examiner* — Sonia Gay
(74) *Attorney, Agent, or Firm* — Novak Druce Connolly Bove + Quigg LLP

(57) ABSTRACT

A telecommunication port testing apparatus includes a first power interface, two first telecommunication ports, a first impedance stabilization network (ISN), a first impedance matching network, and a second impedance matching network. The first ISN includes an input, an output, and a signal detecting pin. The first power interface is connected to the input of the first ISN through the first impedance matching network and one of the two first telecommunication ports in that order. The output of the first ISN is grounded through the other one of the two first telecommunication ports and the second impedance matching network in that order.

7 Claims, 5 Drawing Sheets

TELECOMMUNICATION PORT TESTING APPARATUS

BACKGROUND

1. Technical Field

The present disclosure relates to port testing apparatuses and particularly to the testing of telecommunication ports of electronic devices.

2. Description of Related Art

Electronic devices for telecommunications need to take a conducted emission test before shipment. The conducted emission test includes two parts, one part is to test power ports and the other part is to test telecommunication ports. The power ports can be easily tested using a common multimeter. However, there is currently no appropriate testing apparatus for easily testing the telecommunication ports. Therefore, there is room for improvement in the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
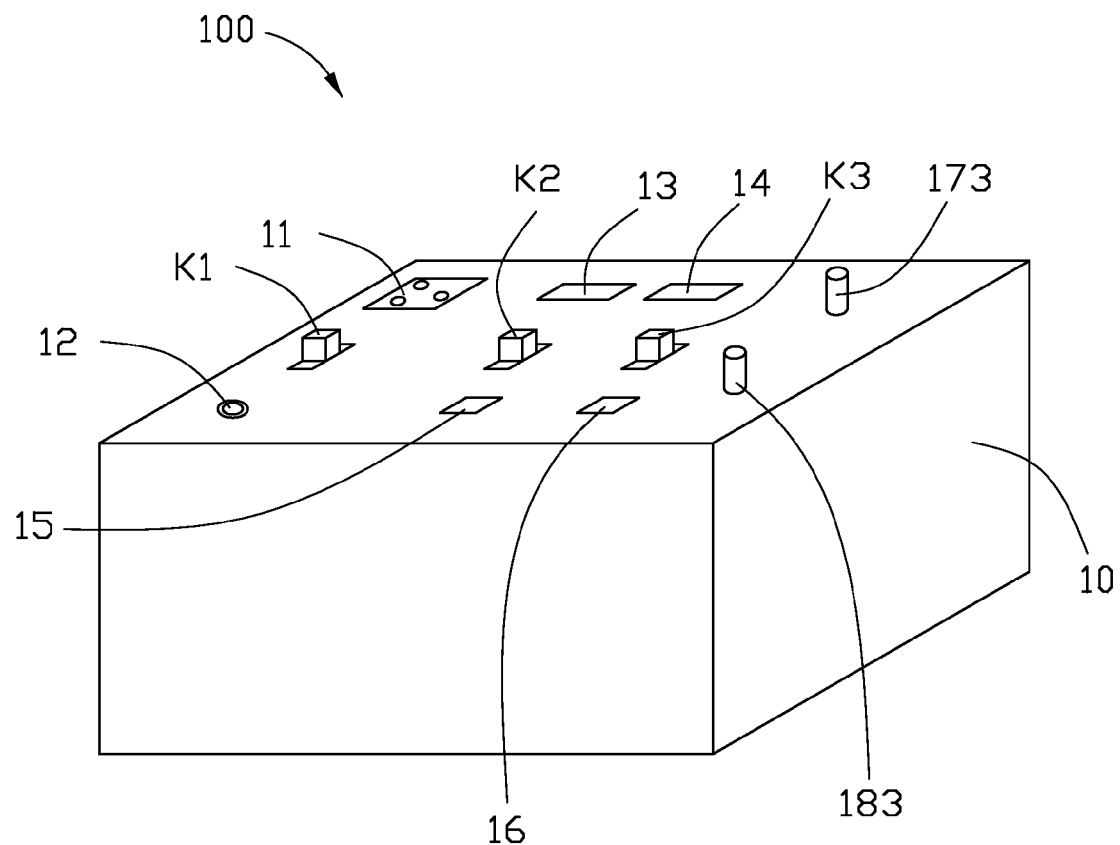
FIG. 1 is a schematic, isometric view of an embodiment of a telecommunication port testing apparatus including a first impedance matching network and a second impedance matching network.
Figure 2:
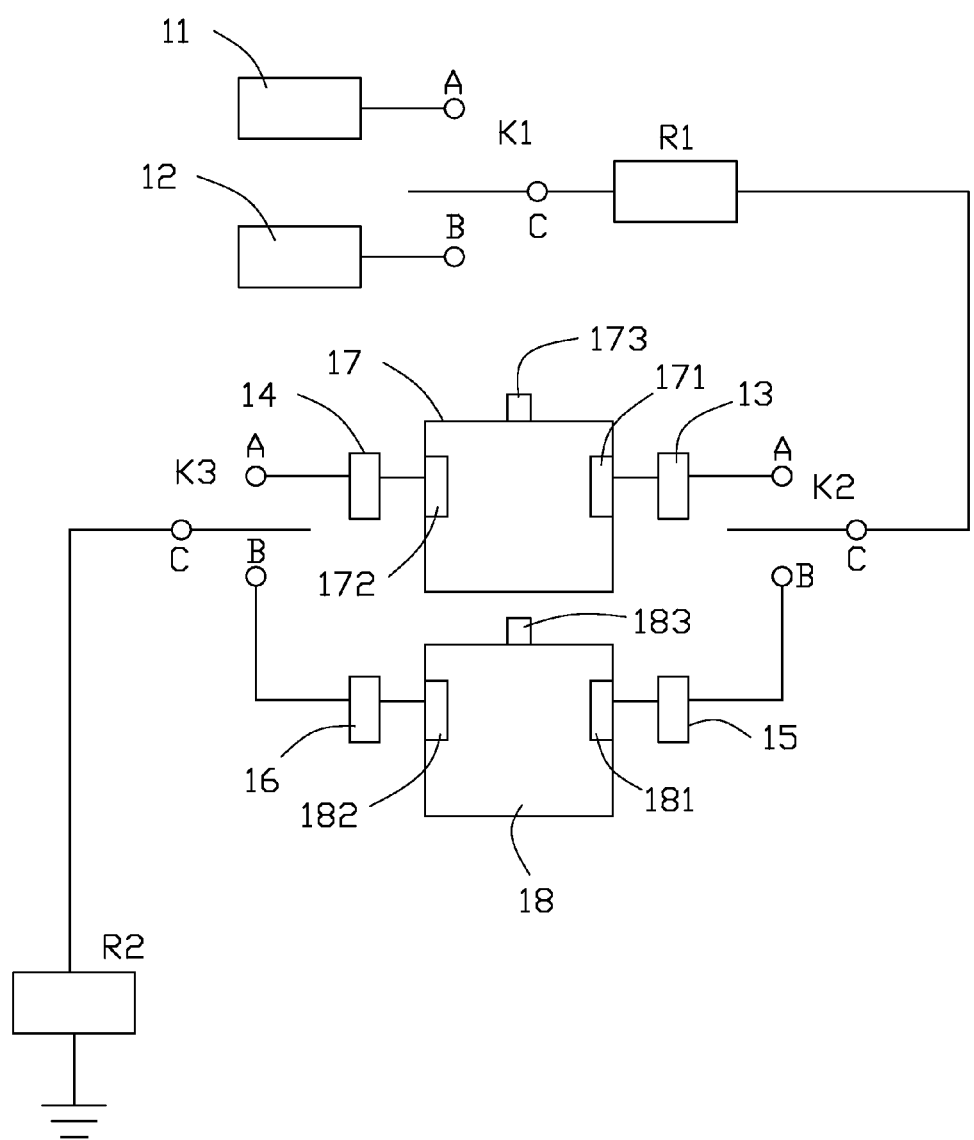
FIG. 2 is a circuit diagram of the telecommunication port testing apparatus of FIG. 1.
Figure 3:
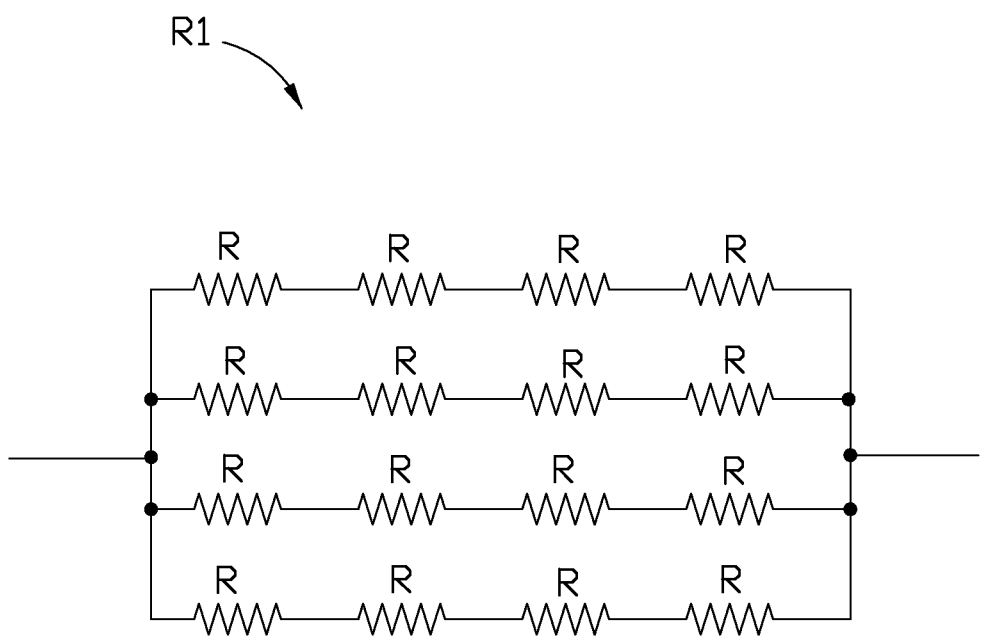
FIG. 3 is a circuit diagram of the first impedance matching network of FIG. 1.
Figure 4:
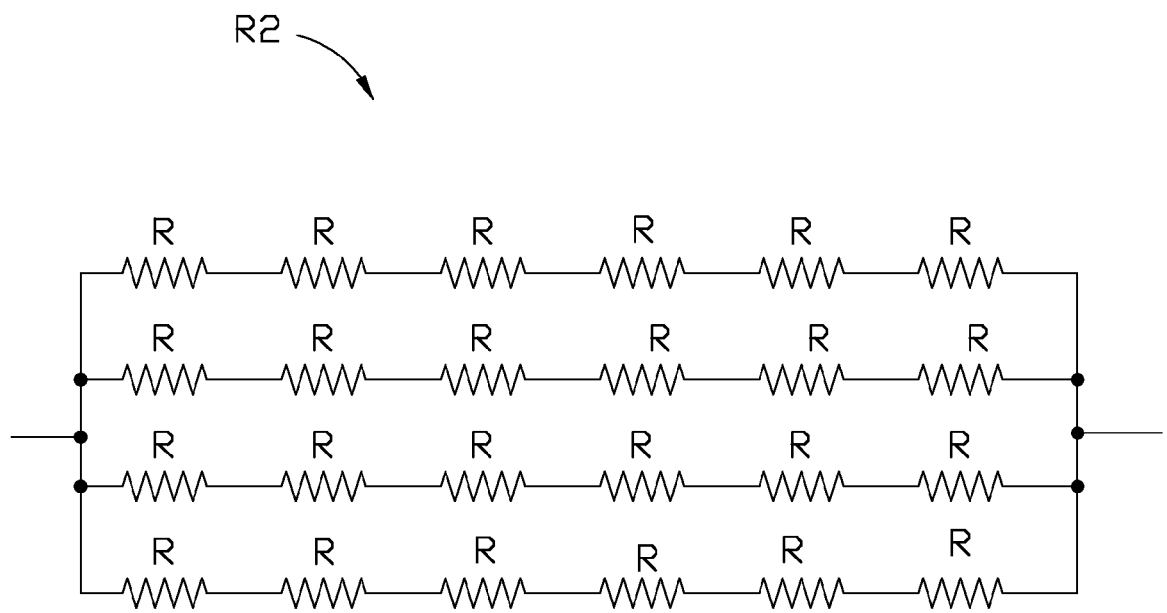
FIG. 4 is a circuit diagram of the second impedance matching network of FIG. 1.

The disclosure, including the accompanying drawing in which like references indicate similar elements, is illustrated by way of example and not by way of limitation. It should be noted that references to "an" or "one" embodiment in this disclosure are not necessarily to the same embodiment, and such references mean at least one.

Referring to FIGS. 1 to 4, an embodiment of a telecommunication port testing apparatus 100 (hereinafter know as testing apparatus 100) includes a case 10. A first power interface 11, a second power interface 12, first to third switches K1-K3, two first ports 13 and 14, two second ports 15 and 16, two signal detecting pins 173 and 183 are arranged on the case 10. Two impedance stabilization networks (ISNs) 17 and 18, a first impedance matching network R1, and a second impedance matching network R2 are arranged in the case 10. Each of the switches K1-K3 includes two switch portions A, B and a connection portion C, the connection portion C can be selectively electrically connected to one of the two switch portions A, B.

In one embodiment, the first power interface 11 is a three-hole power interface, namely three hole wall outlet, and the second power interface 12 is an N-type power interface. The first power interface 11 and the second power interface 12 also can be changed to other types of power interfaces according to requirements. In other embodiments, one of either the first power interface 11 or the second power interface 12 can be deleted or more than one other different power interfaces can be added to the testing apparatus 100 to satisfy different power interface requirements. The first switch K1 is used to switch the first power interface 11 and the second power interface 12. If there is only one type of power interface, the first switch K1 is correspondingly deleted.

In one embodiment, the first ports 13 and 14 are network ports, and the second ports 15 and 16 are telephone ports. The first ports 13 and 14 and the second ports 15 and 16 also can be changed to other types of ports according to requirements. In other embodiments, one of the first ports 13 and 14 and the second ports 15 and 16 can be deleted or more than one of other different ports can be added to the testing apparatus 100 to satisfy different telecommunication port requirements. The second switch K2 is used to switch the first port 13 and the second port 15, the third switch K3 is used to switch the first port 14 and the second port 16. If there is, only one type of telecommunication port, the second switch K2 and third switch K3 are also deleted correspondingly. Likewise, one of the ISNs 17 and 18 are also correspondingly deleted if there is only one type of telecommunication port.

The ISN 17 includes an input 171, an output 172, and the signal detecting pin 173. The ISN 18 includes an input 181, an output 182, and the signal detecting pin 183. The first power interface 11 and the second power interface 12 are respectively connected to the two switch portions of the first switch K1. The connection portion of the first switch K1 is connected to the connection portion of the second switch K2 through the first impedance matching network R1. The two switch portions of the switch K2 are respectively connected to the first port 13 and the second port 15. The first port 13 is connected to the input 171 of the ISN 17. The second port 15 is connected to the input 181 of the ISN 18. The output 172 of the ISN 17 is connected to the first port 14. The output 182 of the ISN 18 is connected to the second port 16. The first port 14 and the second port 16 are respectively connected to the two switch portions of the third switch K3. The connection portion of the switch K3 is grounded through the second impedance matching network R2.

The first impedance matching network R1 and the second impedance matching network R2 are used to match the impedance of the ISNs 17 and 18. In one embodiment, the impedances of the first impedance matching network R1 and the second impedance matching network R2 are respectively 100 ohms and 150 ohms. To make the impedances more precise, the first impedance matching network R1 and the second impedance matching network R2 each includes a plurality of resistors connected together. In one embodiment, the first impedance matching network R1 includes sixteen resistors R connected in a 4*4 matrix. The resistance of the resistor R is 100 ohms. The second impedance matching network R2 includes twenty-four resistors R connected in a 6*4 matrix.

Figure 5:
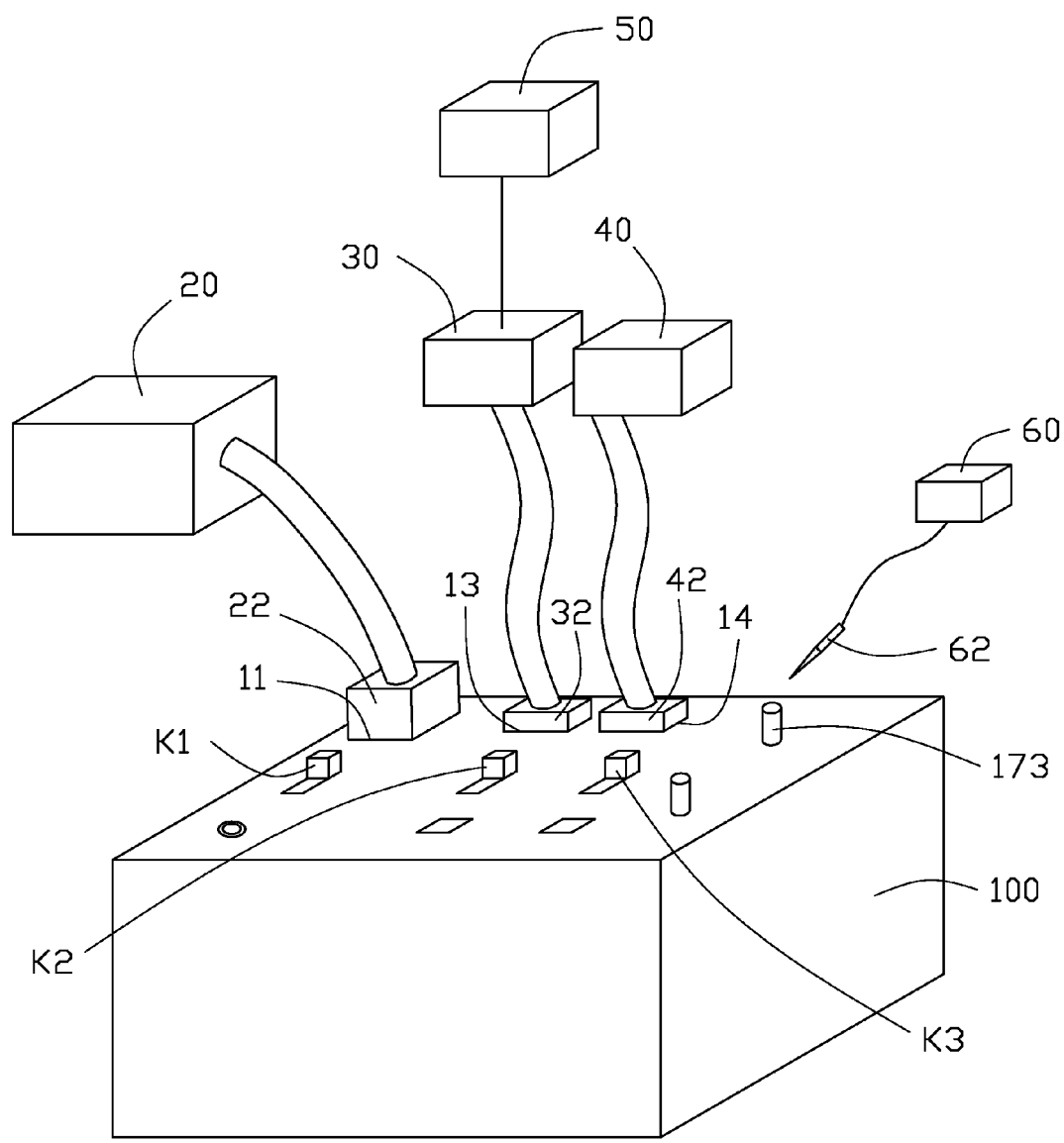
FIG. 5 is schematic, isometric view of the telecommunication port testing apparatus of FIG. 1 testing an electronic device.

Referring to FIG. 5, a telecommunication port (not shown) of a first computer 30 is to be tested. If the telecommunication port of the first computer 30 is a network port, the telecommunication port is connected to the first port 13 of the testing apparatus 100 through a telecommunication cable having a corresponding telecommunication connector 32. A telecommunication port (not shown) of a second computer 40 is connected to the first port 14 of the testing apparatus 100 through a telecommunication cable having a corresponding telecommunication connector 42. Thereby, the first computer 30 and the second computer 40 can communicate with each other through the ISN 17. The first computer 30 is also connected to a linearity impedance stabilization networks (LISN) 50 to receive power. The LISN 50 supplies pure and stable power to the first computer 30, which make the testing of the first computer 30 be more accurate. The connection portion C of the second switch K2 is electrically connected to the switch portion A of the second switch K2. The connection portion C of the third switch K3 is electrically connected to the switch portion A of the third switch K3. A site source 20 is connected to one corresponding power interface of the power interfaces 11 and 12 through a power cable having a corresponding power connector port 22, and the switch K1 is switched to the corresponding power interface of the power interfaces 11 and 12. Thereby, the site source 20 can supply a reference signal to the ISN 17. When the second computer 40 outputs a telecommunication signal to the first computer 30, the ISN 17 receives reference signal from the site source 20 to establish a reference standard and picks up conducted noise from the first computer 30 and isolates the noise from the second computer 40 according to the reference standard. A test probe 62 of an electro magnetic interference (EMI) receiver 60 touches the signal detecting pin 173, thereby the noise from the first computer 30 can be detected by the EMI receiver 60, which is very convenient and accurate. Similarly, a telephone port can be tested using ISN 18.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A telecommunication port testing apparatus comprising:
   a first power interface;
   two first telecommunication ports;
   a first impedance stabilization network (ISN) comprising an input, an output, and a signal detecting pin;
   a first impedance matching network, wherein the first power interface is connected to the input of the first ISN through the first impedance matching network and one of the two first telecommunication ports in that order;
   a second impedance matching network, wherein the output of the first ISN is grounded through the other one of the two first telecommunication ports and the second impedance matching network in that order;
   a second ISN comprising an input, an output, and a signal detecting pin;
   a first switch;
   a second switch; and
   two second telecommunication ports respectively connected to the input and the output of the second ISN, wherein the first switch is operable to switch the first impedance matching network to selectively connect to the corresponding first and second telecommunication ports, the second switch is operable to switch the second impedance matching network to selectively connect to the corresponding first and second telecommunication ports.

2. The telecommunication port testing apparatus of claim 1, further comprising:
   a second power interface; and
   a third switch to switch the first impedance matching network to selectively connect to one of the first and second power interfaces.

3. The telecommunication port testing apparatus of claim 2, wherein the first power interface is a three-hole power interface, the second power interface is an N-type power interface.

4. The telecommunication port testing apparatus of claim 1, wherein each first telecommunication port is a network port, each second telecommunication port is a telephone port.

5. The telecommunication port testing apparatus of claim 1, wherein the first and second impedance matching networks each comprises a plurality of resistors connected in a matrix.

6. The telecommunication port testing apparatus of claim 5, wherein the impedance of the first impedance matching network is 100 ohms, and the first impedance matching network comprises sixteen 100 ohm resistors connected in a 4*4 matrix.

7. The telecommunication port testing apparatus of claim 5, wherein the impedance of the second impedance matching network is 150 ohms, and the second impedance matching network comprises twenty-four 100 ohm resistors connected in a 6*4 matrix.

* * * * *